(No Model.)
J. C. DIBB.
STRETCHING DEVICE FOR BOLTING CLOTHS.
No. 457,638. Patented Aug. 11, 1891.
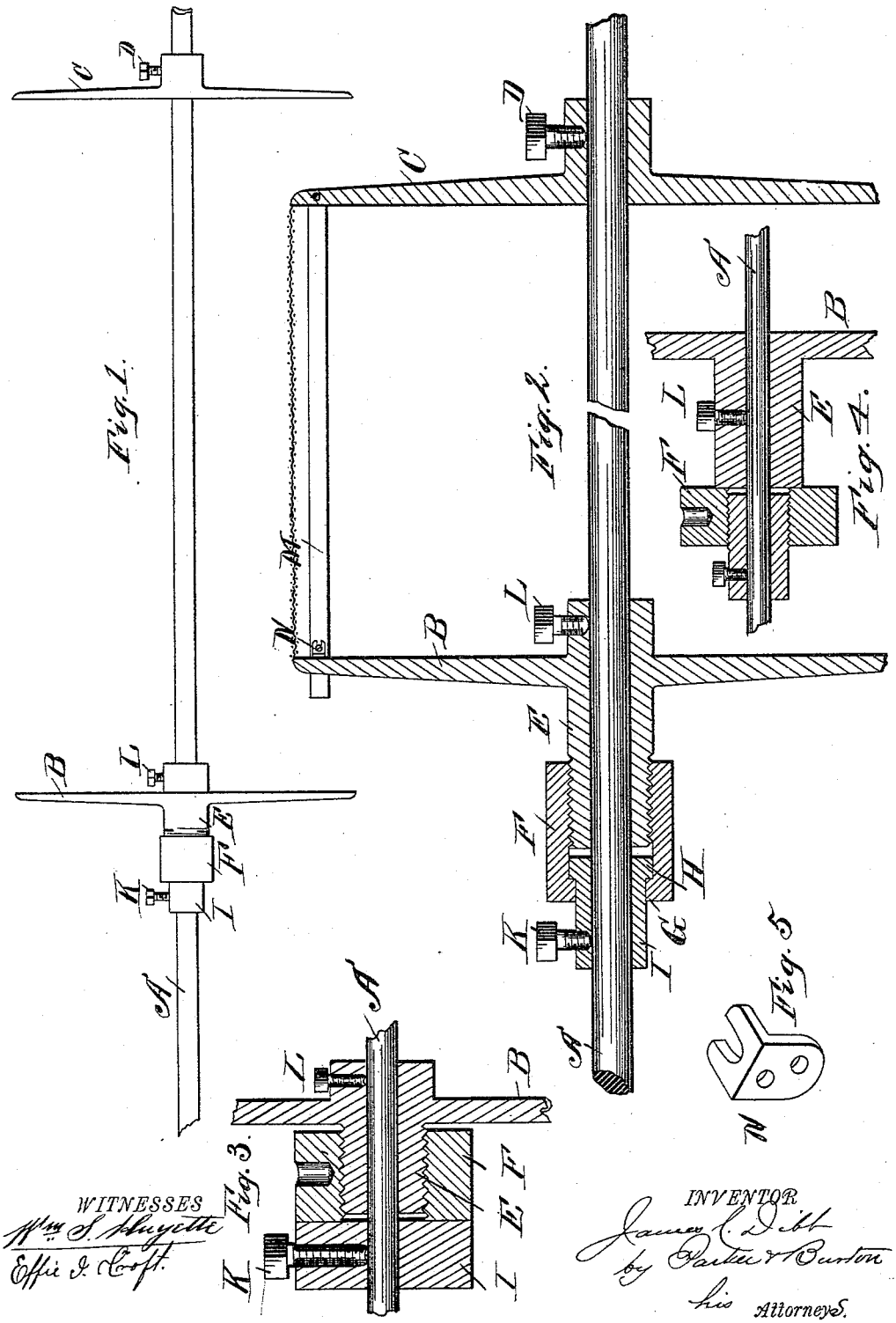

UNITED STATES PATENT OFFICE.

JAMES C. DIBB, OF JACKSON, MICHIGAN.

STRETCHING DEVICE FOR BOLTING-CLOTHS.

SPECIFICATION forming part of Letters Patent No. 457,638, dated August 11, 1891.

Application filed November 7, 1890. Serial No. 370,592. (No model.)

*To all whom it may concern:*

Be it known that I, JAMES C. DIBB, a citizen of the United States, residing at Jackson, in the county of Jackson and State of Michigan, have invented a new and useful Improvement in Stretching Devices for Bolting-Cloths, of which the following is a specification.

This invention relates to milling, and has for its object the production of a stretching or straining device by means of which the cloth used for bolting purposes may be stretched tightly between the heads of the bolting-reel.

Figure 1 represents a side elevation of the shaft and heads or spiders of the bolting-reel, and Fig. 2 represents the same in section. Figs. 3 and 4 represent modifications of the tension-nut. Fig. 5 represents the forked foot-piece used to hold the elevator-rib adjustably to the reel end.

A represents the shaft, mounted and driven in the usual way.

B and C are the heads or spiders to which the bolting-cloth is attached. The head C is held to the shaft A by a set-screw D, or in any other convenient way. In connection with the head B there is a ring or thimble I on the shaft, held to it adjustably by means of a set-screw K, and there is also an internally-threaded nut F.

In the form shown in Fig. 2 the hub E of the head B is extended and threaded, and the nut F, internally threaded to fit the external threads on the hub E, has an internal collar or flange, and the thimble I has an external collar or flange, and the size is so adjusted that the one cannot pass through the other; but the nut F can be passed over the body of the thimble I until the internal flange on the nut F comes against the external flange on the thimble I, and the threads on the interior of the nut F, meshing with the threads on the hub E, draw the hub E and the thimble I together. The thimble I is placed on the outside of the reel, and the structure is so arranged that by fastening the thimble I to the shaft A by means of the set-screw K and loosening the set-screw L the spider B can be drawn forcibly along the shaft and the cloth stretched.

In the form shown in Fig. 3 the parts are reversed. The threaded portion of the hub is inside of the reel and the arrangement of the parts F and I is such that the thimble I forms an abutment, against which the nut F pushes, and thus separates the hub E from the thimble I.

In the form shown in Fig. 4 the screw is formed on the thimble I and the nut F abuts against the end of the hub.

In each case the arrangement is such that there is a part of variable length between the spider or reel-head and the setting-nut holding the part of variable length to the shaft.

M represents the elevator-bucket attached to the arms of the spider just within the bolting-cloth. This is bolted to the fixed spider C, and is held to the movable spider B by means of a headed screw and forked foot-piece N. This holds the bucket securely to the spider and permits the arm of the spider to move endwise along the bucket M. The amount of this motion need not be great, as the amount of end motion of the reel-head is usually through quite a limited space.

Having thus described my invention, what I claim as novel, and desire secured to me by Letters Patent, is—

In a bolting-reel, the combination of a fixed head, a movable head arranged to be adjustably held upon the shaft to both heads, an elevator fastened to the fixed head, a slotted foot-piece fastened to the movable head, and a sliding joint connection between the said elevator-bucket and the said foot-piece, substantially as and for the purpose described.

JAMES C. DIBB.

Witnesses:
CHARLES H. FISK,
D. E. WILBER.